(12) United States Patent
Jung et al.

(10) Patent No.: US 9,718,104 B2
(45) Date of Patent: Aug. 1, 2017

(54) SYSTEM AND METHOD FOR REMEDIATING HIGHLY CONTAMINATED FINE SOIL USING MULTIPLE MICRO HYDROCYCLONES

(75) Inventors: Jungyo Jung, Seoul (KR); Wan Hyup Kang, Yongin-si (KR); Heehun Chae, Yongin-si (KR); Junghee Chang, Seoul (KR)

(73) Assignee: HYUNDAI ENGINEERING & CONSTRUCTION CO., LTD., Seoul (KR)

(*) Notice: Subject to any disclaimer, the term of this patent is extended or adjusted under 35 U.S.C. 154(b) by 561 days.

(21) Appl. No.: 14/357,233

(22) PCT Filed: Mar. 28, 2012

(86) PCT No.: PCT/KR2012/002245
§ 371 (c)(1),
(2), (4) Date: Jun. 17, 2014

(87) PCT Pub. No.: WO2013/069852
PCT Pub. Date: May 16, 2013

(65) Prior Publication Data
US 2014/0345649 A1    Nov. 27, 2014

(30) Foreign Application Priority Data
Nov. 10, 2011    (KR) .................. 10-2011-0116870

(51) Int. Cl.
*B09C 1/02*    (2006.01)
*B07B 7/086*    (2006.01)
(Continued)

(52) U.S. Cl.
CPC .................. *B09C 1/02* (2013.01); *B04C 9/00* (2013.01); *B07B 7/086* (2013.01); *B07B 13/04* (2013.01); *B04C 2009/002* (2013.01)

(58) Field of Classification Search
CPC ..... B04C 2009/002; B04C 9/00; B07B 13/04; B07B 7/086; B09C 1/02
See application file for complete search history.

(56) References Cited

U.S. PATENT DOCUMENTS 5,182,023 A * 1/1993 O'Connor ............... C02F 1/441
                                                    210/650
5,466,426 A * 11/1995 Fristad ..................... B09C 1/02
                                                     423/98
(Continued)

FOREIGN PATENT DOCUMENTS

JP    2000-167432 A    6/2000
KR    1020030005713 A   1/2003
(Continued)

OTHER PUBLICATIONS

Machine translation of KR10-20100102771 dated Sep. 2010.*
(Continued)

*Primary Examiner* — Douglas Lee
(74) *Attorney, Agent, or Firm* — Perkins IP Law Group LLC; Jefferson Perkins

(57) ABSTRACT

The present invention relates to a system for remediating highly contaminated fine soil using multiple micro hydrocyclones that includes: a mill adapted to mix contaminated soil with water and to individualize the soil; a screen adapted to separate the soil introduced from the mill into soil having given particle sizes; a separator adapted to finely separate the soil having particle sizes of less than a given value by particle size from the soil having the given particle sizes separated through the screen; a remediating unit adapted to wash the finely separated soil introduced from the separator by particle size by means of process water for washing; and a filtering unit adapted to separately discharge the soil
(Continued)

washed and introduced through the remediating unit and the process water for washing contained in the soil.

9 Claims, 6 Drawing Sheets

(51) Int. Cl.
*B04C 9/00* (2006.01)
*B07B 13/04* (2006.01)

(56) References Cited

U.S. PATENT DOCUMENTS

| | | | |
|---|---|---|---|
| 5,772,776 A * | 6/1998 | Holbein | B03D 1/012 134/10 |
| 6,273,263 B1 * | 8/2001 | Bergeron | B03D 1/02 209/164 |
| 6,503,337 B1 * | 1/2003 | Roberts | B09C 1/02 134/22.14 |

FOREIGN PATENT DOCUMENTS

| | | |
|---|---|---|
| KR | 1020030072144 A | 9/2003 |
| KR | 1020050081622 A | 8/2005 |
| KR | 100639042 B1 | 10/2006 |
| KR | 100958067 B1 * | 5/2010 |
| KR | 102010-0102771 | 9/2010 |
| KR | 1020100102771 A * | 9/2010 |
| KR | 1020100102771 A | 9/2010 |

OTHER PUBLICATIONS

Machine translation of KR10-0958067 dated May 2010.*
Written Opinion of PCT/KR2012/002245 dated May 2014.*
Korean Intellectual Property Office / ISA, International Search Report and Written Opinion of the International Searching Authority issued on Patent Application No. PCT/KR2012/002245 on Oct. 29, 2012.

* cited by examiner

SYSTEM AND METHOD FOR REMEDIATING HIGHLY CONTAMINATED FINE SOIL USING MULTIPLE MICRO HYDROCYCLONES

TECHNICAL FIELD

The present invention relates to a system and method for remediating contaminated soil, and more particularly, to a system and method for remediating highly contaminated fine soil using multiple micro hydrocyclones which finely separates the contaminated soil with contaminants like heavy metals by using the multiple micro hydrocyclones in accordance with the contamination degrees of the soil by particle size.

BACKGROUND ART

With the development of the industry, soil becomes contaminated with hazardous substances like oil and heavy metals, and so as to remediate the contaminated soil, thus, compositions or devices for washing the contaminated soil have been suggested.

One example of such soil washing devices is disclosed in Korean Patent Laid-Open Application No. 2003-0005713 (dated on Jan. 23, 2003) wherein the soil washing device includes a pre-washing tank and a main washing tank by which the contaminated soil can be repeatedly washed.

Further, the conventional soil washing device is configured wherein the contaminated soil is collected and poured into a mixing tank for remediation.

In this case, referring to FIG. 1 showing general soil remediation efficiencies in accordance with the particle sizes of soil, soil is separated into coarse soil such as gravel and stone having particle sizes of more than 2 mm, medium soil such as sand having particle sizes between 0.075 mm and 2 mm, and fine soil such as silt and clay having particle sizes of less than 0.075 mm. If the coarse soil, the medium soil and the fine soil are remediated, in view of the remediation cost and time efficiency, the coarse soil is within a substantially economical range, the fine soil is within inefficient economical range, and the medium soil is within intermediate economical range.

However, disadvantageously, the conventional soil washing devices just perform the remediation of all of the contaminated soil, irrespective of soil properties and the soil contamination degrees caused by the soil properties, that is, irrespective of the differences of the particle sizes of soil on a paddy field, farm, seaside and mountain range and the contamination degrees of the soil by particle size, thereby showing low efficiencies in remediation work.

DISCLOSURE OF INVENTION

Technical Problem

Accordingly, the present invention has been made in view of the above-mentioned problems occurring in the prior art, and it is an object of the present invention to provide a system and method for remediating highly contaminated fine soil using multiple micro hydrocyclones which largely separates contaminated soil into fine soil containing a large amount of silt and medium soil containing a large amount of sand and finely separates the highly contaminated soil by particle size from the separated soil, such that only the highly contaminated soil can be intensively remediated.

Solution to Problem

To accomplish the above object, according to a first aspect of the present invention, there is provided a system for remediating highly contaminated fine soil using multiple micro hydrocyclones, the system including: a mill adapted to mix contaminated soil with water and to individualize the soil; a screen adapted to separate the soil introduced from the mill into soil having given particle sizes a separator adapted to finely separate the soil having particle sizes of less than a given value by particle size from the soil having the given particle sizes separated through the screen a remediating unit adapted to wash the finely separated soil introduced from the separator by particle size by means of process water for washing; and a filtering unit adapted to separately discharge the soil washed and introduced through the remediating unit and the process water for washing contained in the soil.

According to the present invention, preferably, the soil remediation system further includes a coagulating and settling unit adapted to coagulate and settle the process water for washing discharged from the filtering unit and a portion of the soil finely separated through the separator According to the present invention, preferably, the soil remediation system further includes a process water for washing-recycling unit adapted to absorb the contaminants of the process water for washing introduced from the coagulating and settling unit and to recycle the process water for washing.

According to the present invention, preferably, the process water for washing-recycling unit is configured to absorb the contaminants inclusive of arsenic in the process water for washing onto $Fe^{3+}$-modified activated carbon.

According to the present invention, preferably, the mill includes a log washer which is an instrument adapted to mix soil and water and to individualize the soil, and the contaminated soil mixed and individualized through the log washer is farm soil.

According to the present invention, preferably, the screen includes a wet vibration screen, and through the screen, the soil is separated into soil like gravel and sand having particle sizes of more than 0.075 mm and fine soil like silt having particle sizes of less than 0.075 mm.

According to the present invention, preferably, the separator includes the multiple micro hydrocyclones corresponding to the number of particle size units of the soil to be separated in such a manner as to be connected serially to each other, and the ranges of the particle sizes for the separation of the soil can be varied in accordance with the introduction speeds and the particle size variations of the lower side discharge parts of the micro hydrocyclones.

According to the present invention, preferably, the separator, which finely separates the soil in accordance with the particle sizes of the soil, includes: a first micro hydrocyclone adapted to introduce the soil having the particle sizes of more than 0.075 mm to the screen again and to convey the soil having the particle sizes of less than 0.075 mm separately; a second micro hydrocyclone adapted to convey the soil having the particle sizes between 0.040 mm and 0.075 mm to the remediating unit and to convey the soil having the particle sizes of less than 0.040 mm separately; and a third micro hydrocyclone adapted to convey the soil having the particle sizes between 0.020 mm and 0.040 mm to the remediating unit and to convey the soil having the particle sizes of less than 0.020 mm to the coagulating and settling unit.

According to the present invention, preferably, the remediating unit is adapted to perform different remediating processes if additional remediating processes are needed in accordance with the contamination degrees of the separated soil by the particle size range, for example, if the fine soil having the particle sizes of less than 0.075 mm is remarkably varied in the contamination degrees in the particle size ranges of 0.040 mm and 0.020 mm, thereby achieving effective remediation.

According to the present invention, preferably, the remediating unit includes: a first mixing tank adapted to conduct the elution of the contaminants through the process water for washing for a period of time if the soil having the particle sizes between 0.040 mm and 0.075 mm is introduced thereto; a second mixing tank adapted to conduct the elution of the contaminants through the process water for washing for a longer period of time than the first mixing tank if the soil having the particle sizes between 0.020 m and 0.040 mm is introduced thereto; and a thickener adapted to convey the highly contaminated soil to the filtering unit in a state of being substantially suppressed in elution of contaminants thereof if the highly contaminated soil coagulated and settled through the coagulating and settling unit is introduced thereto.

According to the present invention, preferably, the filtering unit includes a vacuum belt filter adapted to discharge the process water for washing from the soil conveyed through a belt filter by means of vacuum.

To accomplish the above object, according to a second aspect of the present invention, there is provided a method for remediating highly contaminated fine soil using multiple micro hydrocyclones, the method including the steps of: performing a milling step wherein contaminated soil is mixed with water and is individualized; performing a separating step wherein the individualized soil through the milling step is separated by particle size; performing a finely separating step wherein the soil having the particle sizes of less than a given value in the soil separated in the separating step is finely separated by particle size; performing a first remediating step wherein the soil having given particle size ranges in the finely separated soil through the finely separating step is washed through process water for washing; and performing a filtering step wherein the process water for washing is separated and discharged from the soil having a given particle size range not passed through the first remediating step in the finely separated soil through the finely separating step and from the soil having the given particle size ranges washed in the first remediating step.

According to the present invention, preferably, in the finely separating step the soil having the particle sizes of more than 0.075 mm is conveyed to the separating step, the soil having the particle sizes between 0.040 mm and 0.075 mm and between 0.020 mm and 0.040 mm is discharged to the first remediating step, and the soil having the particle sizes of less than 0.020 mm is discharged to the filtering step.

According to the present invention, preferably, in the first remediating step the soil retained separately by particle size is washed through the process water for washing.

According to the present invention, preferably, the method further includes the steps of: performing a coagulating and settling step wherein the soil having the particle sizes of less than 0.020 mm finely separated in the finely separating step is coagulated and settled and the coagulated and settled soil is discharged to the filtering step; and performing a second remediating step wherein the highly contaminated soil discharged from the coagulating and settling step is discharged to the filtering step in a state of being substantially suppressed in elution of the contaminants thereof.

To accomplish the above object, according to a third aspect of the present invention, there is provided a method for remediating highly contaminated fine soil using multiple micro hydrocyclones, the method including the steps of: performing a milling step wherein contaminated soil is mixed with water and is individualized; performing a separating step wherein the individualized soil is separated into coarse soil like gravel and sand having particle sizes of more than 0.075 mm and fine soil having particle sizes of less than 0.075 mm performing a finely separating step wherein the soil having the particle sizes of more than 0.075 mm introduced from the separating step is conveyed to the separating step, and the soil having the particle sizes between 0.040 mm and 0.075 mm, between 0.020 mm and 0.040 mm, of less than 0.020 mm is finely separated and discharged performing a first remediating step wherein the soil having given particle size ranges between 0.040 mm and 0.075 mm and between 0.020 mm and 0.040 mm in the finely separated soil is stored separately and washed through process water for washing; performing a filtering step wherein the soil introduced from the first remediating step and the process water for washing introduced together with the soil are separately discharged performing a coagulating and settling step wherein the process water for washing separated in the filtering step and the soil having the particle sizes of less than 0.020 mm finely separated in the finely separating step are agitated and coagulatedlysettled; performing a second remediating step wherein the highly contaminated soil discharged from the coagulating and settling step is discharged to the filtering step in a state of being substantially suppressed in elution of the contaminants thereof and performing a purifying and returning step wherein the process water for washing supplied to the coagulating and settling step is collected and purified and the purified water is conveyed to the milling step.

According to the present invention, preferably, in the purifying and returning step the contaminants inclusive of arsenic in the process water for washing is absorbed onto $Fe^{3+}$-modified activated carbon.

Advantageous Effects of Invention

According to the present invention, the highly contaminated soil is collectively separated by particle size in accordance with soil properties, and thus, the remediation is intensively performed for the soil by particle size.

In addition, through the intensive remediation of the soil by particle size, the present invention can prevent the inefficient work wherein even the soil having particle sizes having relatively low contamination degrees is remediated together with the soil having particle sizes having relatively high contamination degrees, and also, the present invention can reduce the working time and costs.

MODE FOR THE INVENTION

Hereinafter, an explanation on a system for remediating highly contaminated fine soil using multiple micro hydrocyclones according to the present invention will be in detail given with reference to the attached drawings.

Configuration

Figure 1:
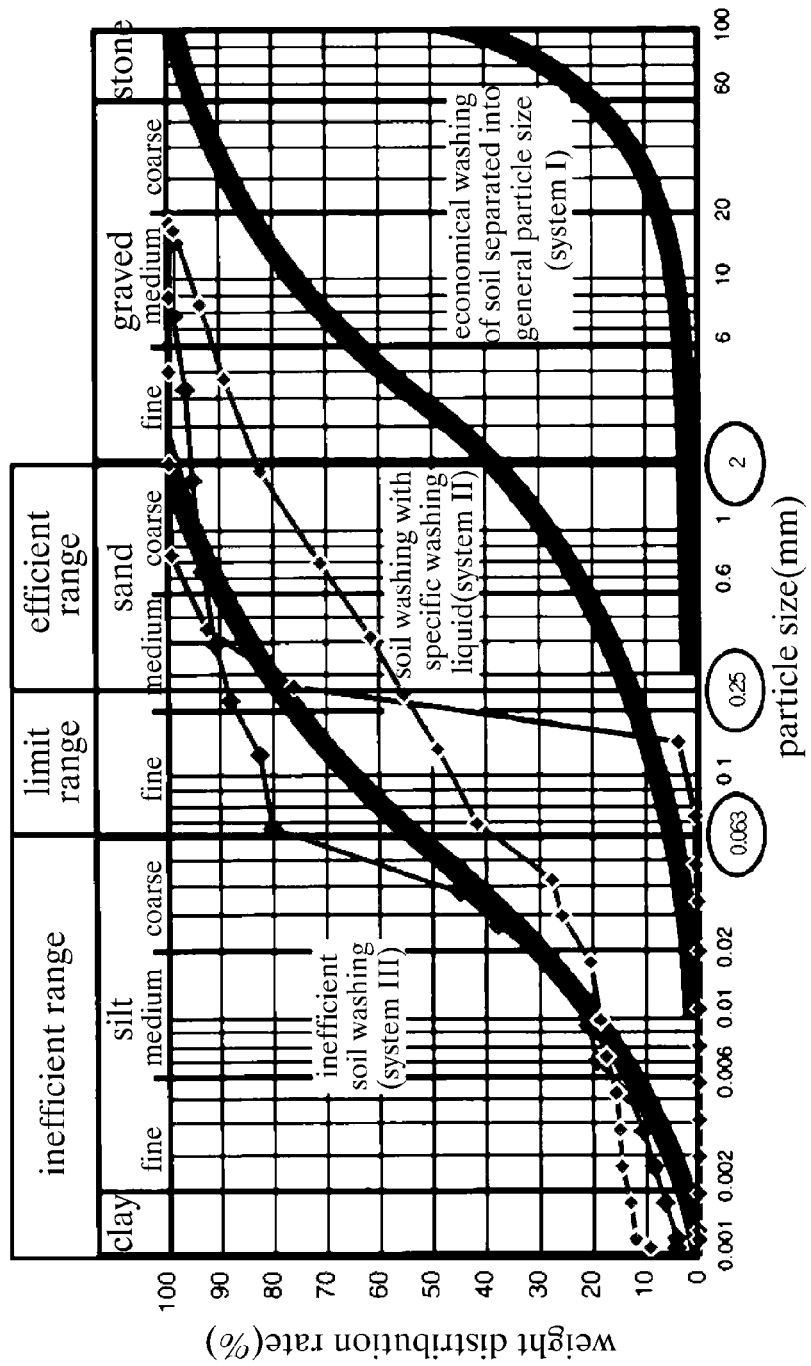
FIG. 1 is a graph showing general soil remediation efficiencies in accordance with the particle sizes of soil.
Figure 2:
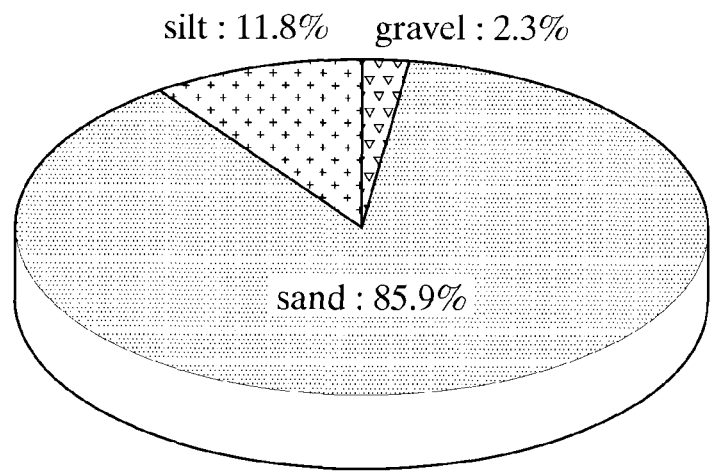
FIG. 2 is a graph showing particle size distribution of farm soil to which a system for remediating highly contaminated fine soil using multiple micro hydrocyclones according to the present invention is applied.
Figure 3:
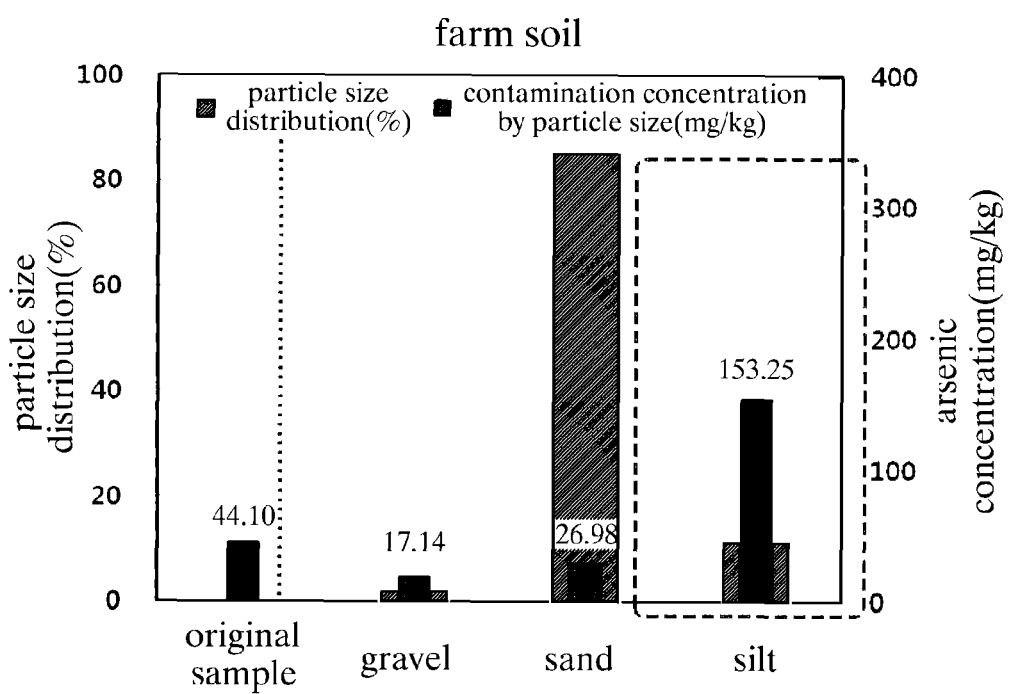
FIG. 3 is graphs showing the analysis of the arsenic contamination concentrations by the particle size of the farm soil in FIG. 2.
Figure 4:
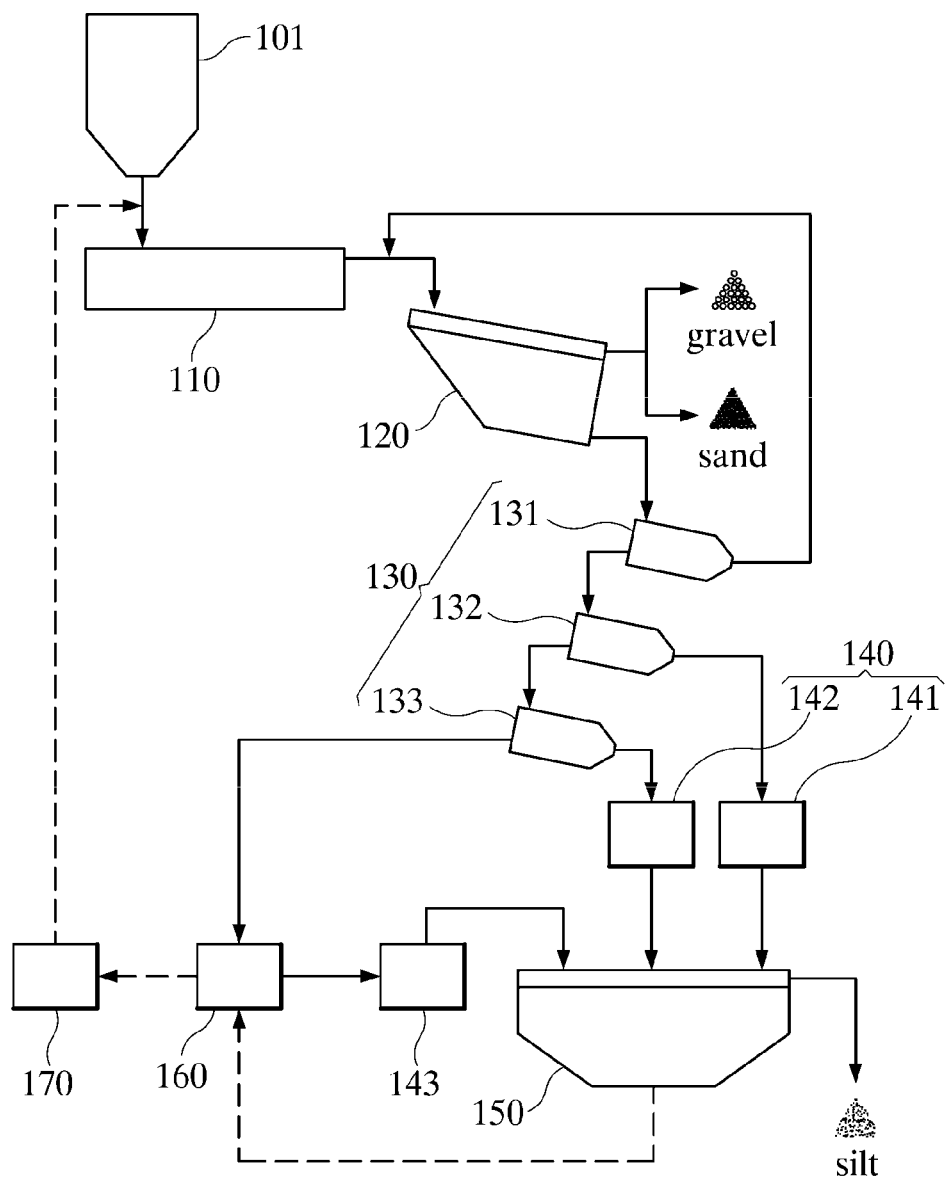
FIGS. 4 and 5 are a schematic view and a block diagram showing a system for remediating highly contaminated fine soil using multiple micro hydrocyclones according to the present invention.
Figure 5:
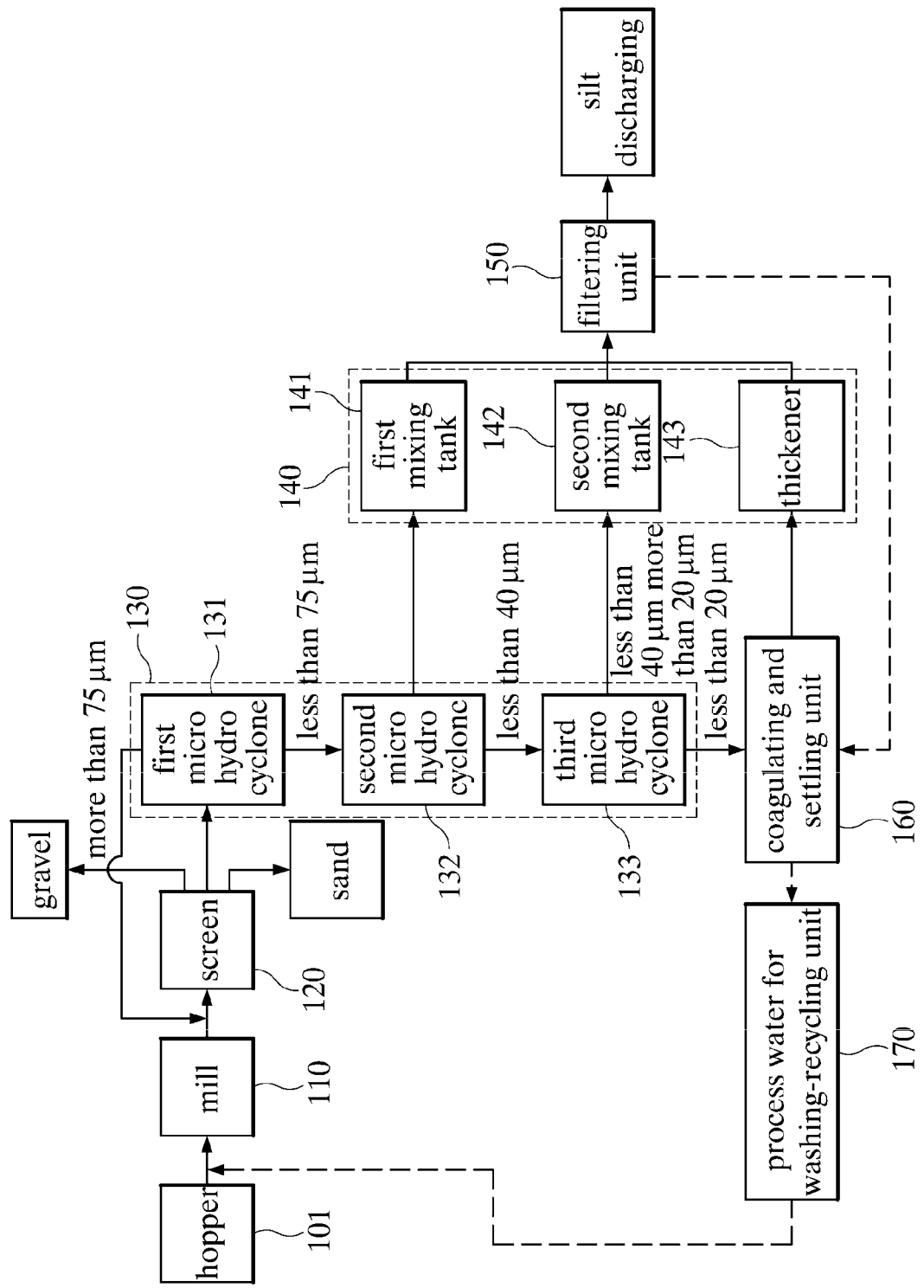
Figure 6:
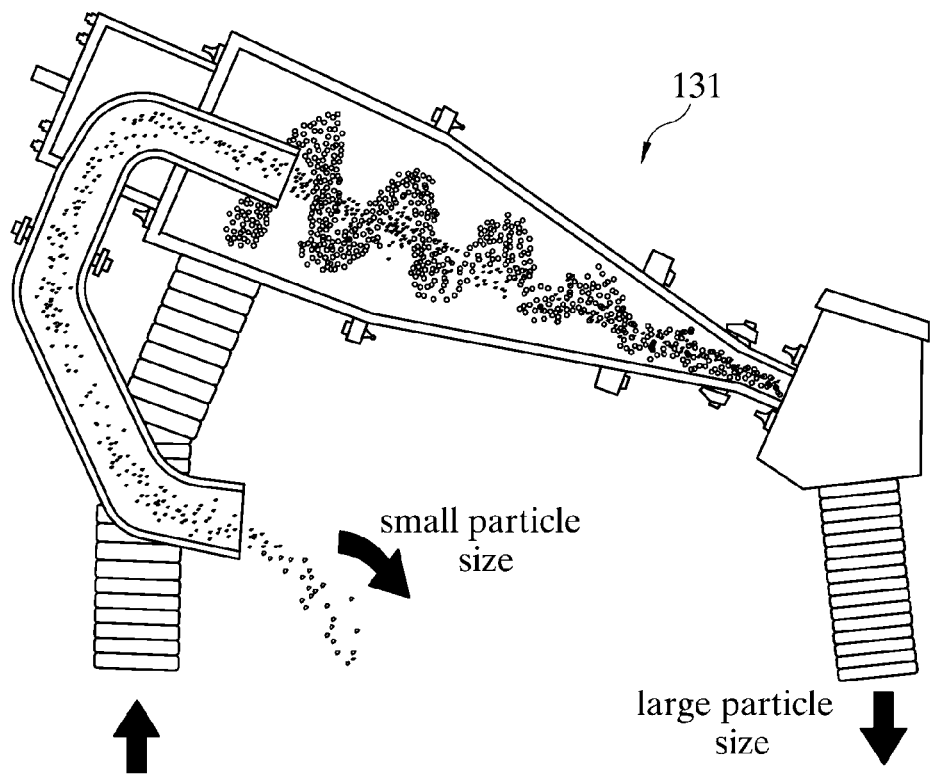
FIG. 6 is a side sectional view showing an operating state of the micro hydrocyclone in FIG. 4.

FIG. 2 is a graph showing particle size distribution of farm soil to which a system for remediating highly contaminated fine soil using multiple micro hydrocyclones according to the present invention is applied, FIG. 3 is graphs showing the analysis of the arsenic contamination concentrations by the particle size of the farm soil in FIG. 2, FIGS. 4 and 5 are a schematic view and a block diagram showing a system for remediating highly contaminated fine soil using multiple micro hydrocyclones according to the present invention, and FIG. 6 is a side sectional view showing an operating state of the micro hydrocyclone in FIG. 4.

According to the present invention, first, a system 100 for remediating highly contaminated fine soil using multiple micro hydrocyclones is provided to remediate highly contaminated soil, especially, the soil in specific areas around plants like steel mills, smelters and so on which is seriously contaminated with contaminants discharged from the plants. In this case, the soil near the smelter area is best in the contamination degree, and at this time, the range of the soil needed to be remediated is within a radius of 2 km around the smelter area. The contaminants contained in the contaminated soil include arsenic (As) as a main contaminant, zinc (Zn), copper (Cu), lead (Pb), cadmium (Cd), nickel (Ni), and the like.

So as to collect the information on the design of the system 100 according to the present invention, on the other hand, the soil around a plant area was separated by particle size into sand of 85.9%, gravel of 2.3% and silt of 11.8%, as shown in FIG. 2. Referring also to the heavy metals-contaminated properties by particle size of the soil separated by particle size, as shown in FIG. 3, the smaller the particle size of the soil is, the higher the cumulative contamination degree is. Especially, as shown in FIG. 3, arsenic is highest in the contamination concentration in the silt, and the above-mentioned description is summarized with Table 1.

TABLE 1

| Particle size (mm) | Particle size distribution (%) | Arsenic Concentration by particle size (mg/kg) |
|---|---|---|
| Original Sample | | 44.10 |
| Gravel (more than 2.0) | 2.33 | 17.14 |
| Sand (between 0.075~2.0) | 85.90 | 26.98 |
| Silt (less than 0.075) | 11.77 | 153.25 |
| Total | 100 | |

Like this, it could be appreciated that the silt soil from the farm soil around the smelter area was highly contaminated with arsenic. Referring to the contamination standards of arsenic as suggested under Asterisk No. 3 of Paragraph 1 of Article 13 of the Soil Environment Conservation Act, on the other hand, a first area has arsenic of 25 mg/kg and a second area has arsenic of 50 mg/kg. Based on the contamination standards of arsenic, as shown in FIG. 3, a remediation standard for the contamination concentration of the farm soil as the first area in the present invention is set to arsenic of 75 mg/kg, and at this time, the soil of the particle size of less than 0.075 mm is selected on the basis of the remediation standard. Through the remediation of the soil of the particle size of less than 0.075 mm, the standards suggested in the Soil Environment Conservation Act are generally satisfied.

The soil remediation system 100 according to the present invention made with the above-mentioned data largely includes a mill 110, a screen 120, a separator 130, a remediating unit 140, a filtering unit 150, a coagulating and settling unit 160 and a process water for washing-recycling unit 170. In this case, soil is separated by particle size through the screen 120 and the separator 130, and the soil separated by particle size contains the soil having different particle sizes therefrom. This is because the separation may be performed with the allowance range of the mechanical errors. Therefore, it should be understood that the boundary values by particle size suggested in the preferred embodiment of the present invention contain the allowance range occurring by the mechanical errors.

If farm soil is introduced from a hopper 101 to the mill 110, the mill 110 is adapted to mix the soil with water to individualize the mixed soil, which includes a log washer used as an existing mill. The log washer is configured to rotate a log in a semi-cylindrical tank disposed slantly so as to individualize soil with water, and to convey and discharge the individualized and broken soil, and to allow silt to overflow in a state of being mixed with water.

The screen 120 is adapted to separate the soil introduced from the mill 110 into gravel having a particle size of more than 2.0 mm, sand having particle sizes between 0.075 mm and 2.0 mm, and silt having particle sizes of less than 0.075 mm. In this case, the screen 120 includes a wet vibration screen used as an existing screen. The weights, water contents and arsenic concentrations of the gravel, sand and silt discharged through the screen 120 from the totally introduced farm soil are listed by the following Table 2. At this time, 3 tons are introduced from the total allowance introduction amount of 6 tons, and the whole arsenic concentration is 32.2 mg/kg.

TABLE 2

| | Particle size (mm) | | |
|---|---|---|---|
| | Gravel (more than 2.0) | Sand (between 0.075~2.0) | Silt (less than 0.075) |
| Soil (ton) | 0.09 | 0.32 | 2.58 |
| (Water content (%) | ±10 | ±15 | ±25 |
| Arsenic Concentration (mg/kg) | 26.7 | 18.6 | 76.6 |

(This data is based on the estimation for the field experiments conducted by Korea Environment Corporation on Dec. 22, 2010).

If the soil mainly containing the silt having particle sizes of less than 0.075 mm is introduced to the separator 130, the separator 130 performs the separation of the soil. In this case, the separator 130 has multiple micro hydrocyclones, as shown in FIG. 6, each of which is configured to discharge light soil having small particle sizes through an upper side separate pipe and to discharge heavy soil having large particle sizes through a lower side separate pipe in accordance with the separation standards of the soil introduced thereto. The micro hydrocyclones are installed to perform fine separation for the soil having smaller particle sizes than the soil separated through general cyclones. In this case, one or more micro hydrocyclones are installed in accordance with the particle size units of the fine separation of the soil, and the number of micro hydrocyclones installed may be varied in accordance with the variation of the particle size units caused by the kinds of the separated soil, the contamination degrees of the soil, and other conditions. According to the present invention, the fine separation of the soil is conducted in three particle size units, and therefore, a first micro hydrocyclone 131, a second micro hydrocyclone 132 and a third micro hydrocyclone 133 are provided. At this time, the first to third micro hydrocyclones 131 to 133 are connected serially to each other.

The first micro hydrocyclone 131 is adapted to introduce the soil having the particle sizes of more than 0.075 mm to the screen 120 again and to convey the soil having the particle sizes of less than 0.075 mm to the second micro hydrocyclone 132.

The second micro hydrocyclone 132 is adapted to convey the soil having the particle sizes between 0.040 mm and 0.075 mm to the remediating unit 140 and to convey the soil having the particle sizes of less than 0.040 mm to the third micro hydrocyclone 133.

The third micro hydrocyclone 133 is adapted to convey the soil having the particle sizes between 0.020 mm and 0.040 mm to the remediating unit 140 and to convey the soil having the particle sizes of less than 0.020 mm to the coagulating and settling unit 160.

The remediating unit 140 is adapted to wash the soil introduced in a state of being separated by particle size from the separator 130 having the multiple micro hydrocyclones. In this case, the remediating unit 140 serves to remediate the contaminated soil with process water for washing.

The remediating unit 140 includes a first mixing tank 141, a second mixing tank 142 and a thickener 143, such that the soil is conveyed in a state of being substantially suppressed in elution of contaminants thereof through the first mixing tank 141, the second mixing tank 142 and the thickener 143 to the filtering unit 150.

If the soil having the particle sizes between 0.040 mm and 0.075 mm is introduced from the second micro hydrocyclone 132, the first mixing tank 141 conducts the washing of the soil with the process water for washing.

If the soil having the particle sizes between 0.020 mm and 0.040 mm is introduced from the third micro hydrocyclone 133, the second mixing tank 142 conducts the washing of the soil with the process water for washing.

At this time, since the particle sizes of the soil introduced into the first mixing tank 141 and the second mixing tank 142 are different from each other and the particle size contamination concentrations are different from each other, the amounts and concentrations of the process water for washing introduced into the first mixing tank 141 and the second mixing tank 142 are also differently set. Thus, concentration measuring instruments may be additionally installed.

Further, if the soil having the particle sizes of less than 0.020 mm is introduced from the coagulating and settling unit 160, as will be discussed later, in which the soil is coagulated, the thickener 143 conveys the soil to the filtering unit 150 in a state of being substantially suppressed in elution of contaminants thereof.

The filtering unit 150 is adapted to convey the washed soil in the remediating unit 140 located on a belt filter thereof and to separate and discharge the process water for washing from the soil. At this time, the soil separated from the filtering unit 150 is stacked to refill the area from which the contaminated soil is collected or is thrown on a separate place. Also, the process water for washing separated from the soil is collected and supplied to the coagulating and settling unit 160.

The coagulating and settling unit 160 has a settling tank in which the soil having the particle sizes of less than 0.020 mm separated in the third micro hydrocyclone 133 and the process water for washing separated from the filtering unit 150 are agitated and settled. At this time, the process water for washing may contain very fine soil passed through the belt filter of the filtering unit 150. Therefore, the settling tank has a separate coagulating agent added thereto to allow the soil having the particle sizes of less than 0.020 mm separated in the third micro hydrocyclone 133 and the fine soil contained in the process water for washing to be coagulated to obtain relatively large particle sizes. The coagulated and settled soil is supplied to the thickener 143, and the process water for washing remaining after the supply of the soil is supplied to the process water for washing-recycling unit 170.

The process water for washing-recycling unit 170 serves to collect and purify the process water for washing from the coagulating and settling unit 160 and to move the purified water to a storage tank in which the process water for washing is stored. At this time, the storage tank has $Fe^{3+}$-modified activated carbon supplied thereinto so as to absorb the contaminants inclusive of arsenic contained in the process water for washing thereonto. Also, the process water for washing-recycling unit 170 is disposed to supply the purified process water for washing to the mill 110 again. Of course, the purified process water for washing is stored in the storage tank and is then introduced again to the mill 110.

Figure 7:
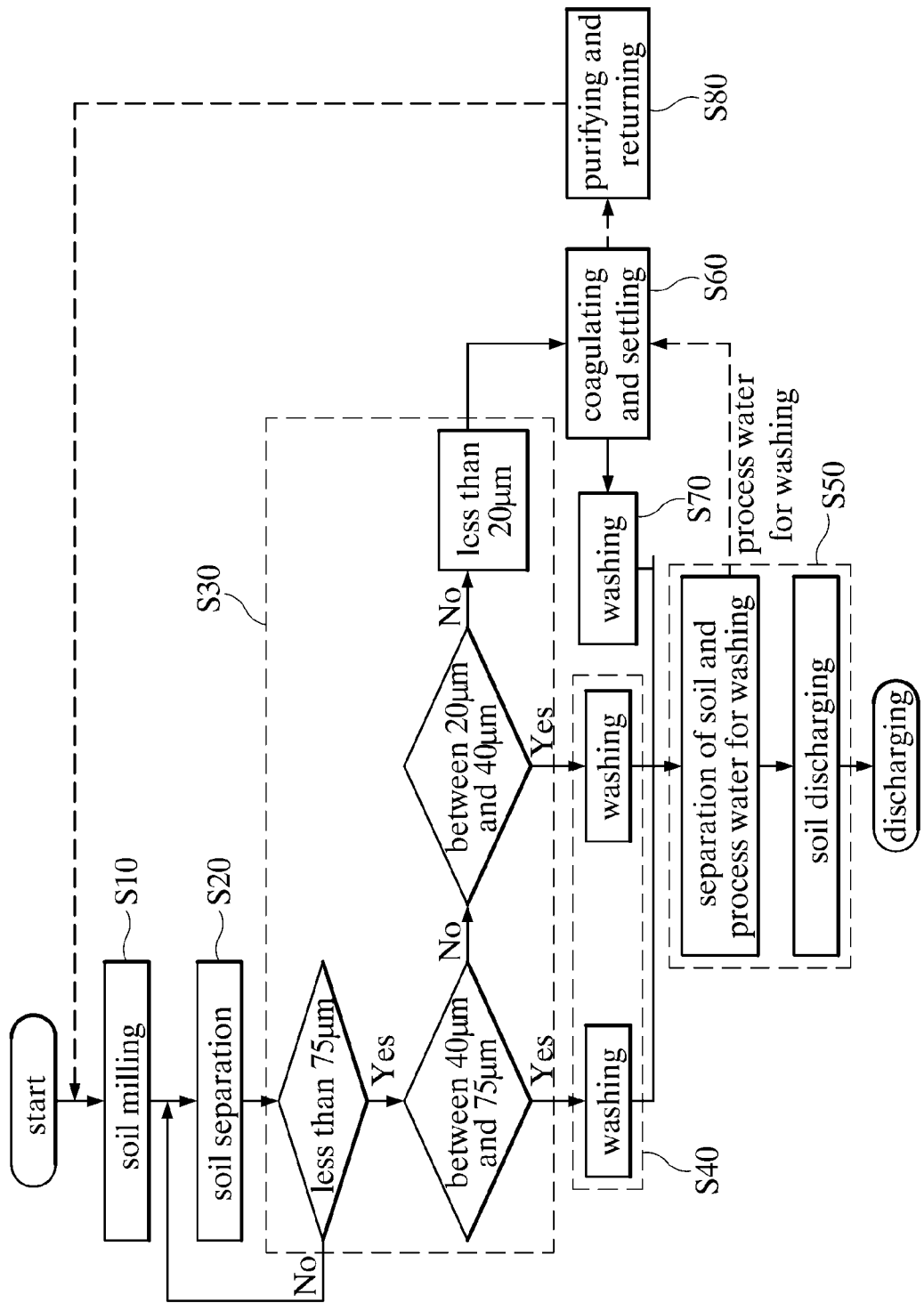
FIG. 7 is a flow chart showing a method for remediating contaminated soil using the system of FIG. 4.

On the other hand, the dotted arrows in FIG. 4, FIG. 5 and FIG. 7 denote the moving paths of only the process water for washing, and the solid arrows therein denote the moving paths of the soil containing water or the process water for washing therein.

Method

FIG. 7 is a flow chart showing a method for remediating contaminated soil using the soil remediation system of FIG. 4.

As shown in FIG. 7, the method for remediating contaminated soil according to the present invention will be in detail described hereinafter. First, the farm soil introduced from the hopper 101 is mixed with water through the mill 110 and is thus individualized and broken down (at step S10). In this case, the mill 110 includes the log washer which is configured to rotate a log in a semi-cylindrical tank disposed slantly so as to individualize soil with water and to convey and discharge the individualized and broken soil, and to allow silt in the soil to overflow in a state of being mixed with water. At this time, the farm soil is collected from the contaminated soil existing on a depth of about 1 m within a radius of 2 km around a smelter and is introduced to the hopper 101.

Next, the broken soil is separated into the soil having predetermined particle sizes through the screen 120 (at step S20). At this time, the screen 120 includes the wet vibration screen, and the soil is separated into gravel having particle sizes of more than 2.0 mm, sand having particle sizes between 0.075 mm and 2.0 mm, and silt having particle sizes of less than 0.075 mm. In this case, the gravel and sand can be separated together with each other, and at this time, the particle sizes of more than and less than 0.075 mm are set.

After that, the soil mainly containing the silt having particle sizes of less than 0.075 mm separated by the screen 120 is finely separated through the separator 130 (at step S30). At this time, the separator 130 includes one or more micro hydrocyclones in accordance with the particle size units of the fine separation of the soil. According to the present invention, the fine separation of the soil is conducted through the first to third micro hydrocyclones 131 to 133 connected serially to each other. Through the first micro hydrocyclone 131, the soil having the particle sizes of 0.075 mm is separated, and thus, the soil having the particle sizes of more than 0.075 mm is conveyed to the screen 120, while the soil having the particle sizes of less than 0.075 mm is being conveyed to the second micro hydrocyclone 132. Through the second micro hydrocyclone 132, the soil having the particle sizes of 0.040 mm is separated, and thus, the soil having the particle sizes between 0.040 mm and 0.075 mm is conveyed to the remediating unit 140, while the soil having the particle sizes of less than 0.040 mm is being conveyed to the third micro hydrocyclone 133. Through the third micro hydrocyclone 133, the soil having the particle sizes of 0.020 mm is separated, and thus, the soil having the particle sizes between 0.020 mm and 0.040 mm is conveyed to the remediating unit 140, while the soil having the particle sizes of less than 0.020 mm is being conveyed to the coagulating and settling unit 160.

Next, if the soil finely separated through the separator 130 is introduced by particle size to the remediating unit 140, the soil is washed with the process water for washing and is thus primarily remediated (at step S40). At this time, since the contamination degrees of the soil by particle size are different from each other, the introducing amounts and concentrations of the process water for washing are varied. In this case, the soil having the particle sizes between 0.040 mm and 0.075 mm is introduced to the first mixing tank 141 and is washed thereinto, and the soil having the particle sizes between 0.020 mm and 0.040 mm is introduced to the second mixing tank 142 and is washed thereinto. Further, the soil having the particle sizes of less than 0.020 mm is circulated to a filtering step (at step S50) via a coagulating and settling step (at step S60) and a second remediating step (at step S70) as will be discussed later.

After that, if the soil washed in the mixing tanks of the remediating step (at the step S40) is introduced to the filtering unit 150 together with the process water for washing, the soil and the process water for washing are separately discharged through the filtering unit 150 (at the step S50). In this case, the soil is conveyed together with the process water for washing and is dewatered by vacuum absorption. At this time, the process water for washing is collected and conveyed to the coagulating and settling unit 160, and the soil is separately stacked and refilled on the area from which the soil is collected or thrown on a given area.

Next, the process water for washing introduced from the filtering unit 150 at the filtering step (at the step S50) and the soil having the particle sizes of less than 0.020 mm separated in the third micro hydrocyclone 133 are agitated and coagulatingly settled (at the step S60). The process water for washing and the soil having the particle sizes of less than 0.02 mm are mixed in the coagulating and settling tank, and at this time, a separate coagulating agent is added to the process water for washing and the soil having the particle sizes of less than 0.02 mm. Through the coagulating agent, the soil having the particle sizes of less than 0.02 mm is coagulated to have a large particle size. Of course, if the agitation is performed by means of an agitator (not shown), the working time can be reduced. In this case, the process water for washing may contain very fine soil passed through the belt filter of the filtering unit 150, and the soil is coagulated with the soil having the particle sizes of less than 0.020 mm by means of the addition of the coagulating agent.

After that, the coagulated and settled soil through the coagulating and settling step (at the step S60) is supplied to the thickener 143 and is then washed by means of the process water for washing so as to perform the second remediating step (at the step S70). At this time, the soil having the particle sizes of less than 0.020 mm is coagulated. This is to allow the soil having the particle sizes of less than 0.020 mm to be increased in particle size through the coagulating and settling step (at the step S60) so as to optimize the separation efficiency of the soil and the process water for washing in the filtering step (at the step S50). Also, the soil discharged from the thickener 143 is conveyed to the filtering step (at the step S50) in a state of being substantially suppressed in elution of contaminants thereof.

Next, the process water for washing except the soil is collected from the coagulating and settling unit 160 and is purified and conveyed through the process water for washing-recycling unit 170 (at step S80). In this case, the purification is conducted by absorbing the contaminants inclusive of arsenic contained in the process water for washing by means of $Fe^{3+}$. At this time, $Fe^{3+}$-modified activated carbon is supplied for the purification. Also, the purified process water for washing is conveyed to the milling step (at the step S10) and is thus supplied to individualize the soil through the mill 110.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A system for remediating highly contaminated farm soil having more contaminated fine soil than coarse soil, the system comprising:

a mill having a first input receiving contaminated soil and a second input receiving process water, the mill mixing the soil with process water, individualized soil appearing at an output of the mill;

a screen having an input coupled to the output of the mill to receive individualized soil therefrom, the screen separating particles of greater than a given size from the individualized soil and producing at the output of the screen a soil having particles of less than a given size;

a separator having an input coupled to the output of the screen and adapted to separate soil appearing at the input of the separator into particles of different size ranges, the separator comprising first, second and third micro hydrocyclones each having an input and first and second outputs, the first, second and third micro hydrocyclones being coupled in series with each other, the first micro hydrocyclone having the input coupled to the output of the screen and separating the soil into particles having sizes greater than 0.075 mm and particles having sizes less than 0.075 mm, the first output of the first micro hydrocyclone coupled to the input of the screen to transmit back thereto particles having sizes greater than about 0.075 mm, the second output of the first micro hydrocyclone coupled to the input of the second micro hydrocyclone to transmit thereto particles having sizes less than about 0.075 mm, particles having sizes in a range of 0.040 to 0.075 mm appearing at the first output of the second micro hydrocyclone, the second output of the second micro hydrocyclone coupled to the input of the third micro hydrocyclone, particles having sizes of less than about 0.040 mm appearing at the second output of the second micro hydrocyclone, particles having sizes in a range of 0.020 mm to 0.040 mm appearing at the first output of the third micro hydrocyclone, particles having sizes of less than 0.020 mm appearing at the second output of the third micro hydrocyclone;

a coagulating and settling unit having a first input coupled to the second output of the third micro hydrocyclone, a second input, a first output and a second output, the coagulating and settling unit adapted to coagulate and settle particles of a size less than 0.020 mm from process water, coagulated and settled particles of less than 0.020 mm appearing at the first output of the coagulating and settling unit, contaminated process water appearing at the second output of the coagulating and settling unit;

a remediating unit including a first mixing tank, a second mixing tank and a thickener, the first mixing tank having an input coupled only to the first output of the second micro hydrocyclone and adapted to elute, with process water, contaminants from particles having sizes in the range of 0.040 mm to 0.075 mm, the first mixing tank having an output;

the second mixing tank having an input coupled only to the first output of the third micro hydrocyclone and adapted to elute, with process water, contaminants from particles having sizes in the range of 0.020 mm to 0.040 mm, the second mixing tank having an output;

the thickener having an input coupled only to the first output of the coagulating and settling unit and an output, the thickener receiving settled and coagulated particles of a size of less than 0.020 mm from the first output of the coagulating and settling unit;

a process water recycling unit having an input coupled to the second output of the coagulating and settling unit for receiving the contaminated process water and an output, the process water recycling unit adapted to absorb contaminants from the contaminated process water, the output of the process water recycling unit coupled to the second input of the mill to supply recycled process water to the mill; and a filtering unit having an input, a first output and a second output, outputs of the first and second mixing tanks and the output of the thickener coupled to the input of the filtering unit, the filtering unit comprising a vacuum belt filter adapted to discharge the process water via the first output of the filtering unit back to the second input of the coagulating and settling unit, soil appearing at the second output of the filtering unit having the concentration of contaminants therein substantially suppressed by elution.

2. The system according to claim 1, wherein the process water recycling unit is configured to absorb contaminants inclusive of arsenic in the process water onto $Fe^{3+}$-modified activated carbon.

3. The system according to claim 1, wherein the mill comprises a log washer adapted to mix soil and water and to individualize the soil.

4. The system according to claim 1, wherein the screen comprises a wet vibration screen.

5. The system according to claim 1, wherein the screen separates the soil into soil like gravel and sand having particle sizes of more than 0.075 mm and fine soil like silt having particle sizes of less than 0.075 mm.

6. The system of claim 1, wherein the first mixing tank and the second mixing tank each have process water inputs, the first and second mixing tanks each having have user-selectable times of mixing and volumes of process water that may be chosen to be different from each other.

7. A method for remediating highly contaminated fine soil using multiple micro hydrocyclones, the method comprising the steps of:

performing a milling step wherein contaminated soil is mixed with water and is individualized;

performing a separating step using a first micro hydrocyclone wherein the individualized soil output from the milling step is separated by particle size into particles having a size greater than 0.075 mm and a soil having particles less than 0.075 mm;

performing a finely separating step wherein the soil having particle sizes of less than 0.075 mm is finely separated by particle size into a soil having particle sizes in the range of 0.040 mm to 0.075 mm using a second micro hydrocyclone and is separated using a third micro hydrocyclone into a soil having particle sizes in the range of 0.020 mm to 0.040 mm and a soil having particle sizes of less than 0.020 mm, soil having particle sizes greater than 0.075 mm being returned to the separating step;

performing a first remediating step in a first mixing tank only on the soil having particle sizes in the range of 0.040 mm to 0.075 mm by washing with process water;

performing a second remediating step in a second mixing tank only on the soil having particle sizes in the range of 0.020 mm to 0.040 mm by washing with process water;

performing a coagulating and settling step only on the soil having particle sizes of less than 0.020 mm in which the last said soil is coagulated and settled and the coagulated and settled soil is discharged to a filtering step;

performing a third remediating step wherein the coagulated and settled soil discharged from the coagulating and settling step is discharged to said filtering step in a state of having the contaminants therein substantially suppressed by elution, and performing said filtering step using a vacuum belt filter wherein the process water is separated from the soil from the first, second and third remediating steps and is discharged.

8. A method for remediating contaminated soil using multiple micro hydrocyclones, the method comprising the steps of:

performing a milling step wherein contaminated soil is mixed with water and is individualized;

performing a separating step using a first micro hydrocyclone wherein the individualized soil is separated into coarse soil like gravel and sand having particle sizes of more than 0.075 mm and a fine soil having particle sizes of less than 0.075 mm;

performing a finely separating step wherein the soil having the particle sizes of more than 0.075 mm introduced from the separating step is conveyed back to the separating step, and the fine soil is separated using a second micro hydrocyclone into a soil having particle sizes between 0.040 mm and 0.075 mm and is separated by a third micro hydrocyclone into a soil having particle sizes between 0.020 mm and 0.040 mm and a soil having particle sizes less than 0.020 mm;

performing a first remediating step in a first mixing tank only on the soil having particle size ranges between 0.040 mm and 0.075 mm;

performing a second remediating step in a second mixing tank only on the soil having particle sizes between 0.020 mm and 0.040 mm;

performing a coagulating and settling step wherein the process water for washing separated in the filtering step and the soil having the particle sizes of less than 0.020 mm finely separated in the finely separating step are agitated and coagulatedly settled;

performing a third remediating step wherein the highly contaminated soil discharged from the coagulating and settling step is discharged to the filtering step in a state of being substantially suppressed in elution of the contaminants thereof;

performing a filtering step using a vacuum belt filter wherein the soil introduced from the first, second and third remediating steps is separately discharged from the process water; and performing a purifying and returning step wherein the process water for washing supplied to the coagulating and settling step is collected and purified and the purified water is conveyed to the milling step.

9. The method for remediating contaminated soil using multiple micro hydrocyclones according to claim 8, wherein in the purifying and returning step the contaminants inclusive of arsenic in the process water for washing are absorbed onto $Fe^{3+}$-modified activated carbon.

* * * * *